United States Patent
Lange et al.

Patent Number: 5,376,150
Date of Patent: Dec. 27, 1994

[54] USE OF PYRIDINE DYES IN THE TEXTILE SECTOR, DYE MIXTURES WITH PYRIDINE DYES, AND TRIAZOLOPYRIDINE DYES HAVING A THIENYL RADICAL

[75] Inventors: Arno Lange, Bad Duerkheim; Volker Bach, Neustadt; Ruediger Sens, Mannheim; Karl-Heinz Etzbach, Frankenthal; Helmut Reichelt, Neustadt; Sabine Gruettner-Merten, Mutterstadt, all of Germany

[73] Assignee: BASF Aktiengesellschaft, Ludwigshafen, Germany

[21] Appl. No.: 116,958

[22] Filed: Sep. 7, 1993

[30] Foreign Application Priority Data

Sep. 29, 1992 [DE] Germany ............... 4232557

[51] Int. Cl.$^5$ ............... C07D 471/02
[52] U.S. Cl. ............... 8/638; 8/643; 544/133; 503/227; 546/119; 546/120; 546/121
[58] Field of Search ............... 8/638, 643; 546/119, 546/120, 121; 544/133; 503/227

[56] References Cited

U.S. PATENT DOCUMENTS

4,681,932  7/1987  Kruckenberg et al. ............ 534/575

FOREIGN PATENT DOCUMENTS

0416434  3/1991  European Pat. Off.
0480252  4/1992  European Pat. Off.
2012050  10/1970  Germany.
WO92/19684  11/1992  WIPO.

*Primary Examiner*—Arthur C. Prescott
*Attorney, Agent, or Firm*—Oblon, Spivak, McClelland, Maier & Neustadt

[57] ABSTRACT

There are described the use of pyridine dyes of the formula

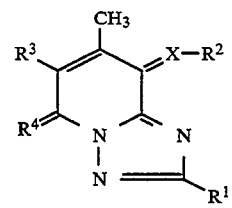

or

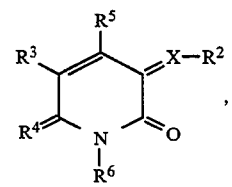

where
$R^1$ is substituted or unsubstituted $C_1$-$C_{20}$-alkyl, substituted or unsubstituted phenyl or hydroxyl,
$R^2$ is a carbocyclic or heterocyclic radical,
$R^3$ is cyano, carbamoyl, carboxyl or $C_1$-$C_4$-alkoxy carbonyl,
$R^4$ is oxygen or the radical of an acidic CH compound,
$R^5$ is hydrogen or $C_1$-$C_4$-alkyl,
$R^6$ is substituted or unsubstituted $C_1$-$C_{20}$-alkyl, substituted or unsubstituted phenyl, hydroxyl or substituted or unsubstituted amino, and
X is nitrogen or optionally CH, for dyeing or printing synthetic fibers, cellulose esters or blends thereof, dye mixtures comprising pyridine dyes of the above formulae and blue disperse dyes, the use thereof for dyeing and printing synthetic fibers, cellulose esters or blends thereof, and triazolopyridine dyes having a thienyl radical.

9 Claims, No Drawings

USE OF PYRIDINE DYES IN THE TEXTILE SECTOR, DYE MIXTURES WITH PYRIDINE DYES, AND TRIAZOLOPYRIDINE DYES HAVING A THIENYL RADICAL

The present invention relates to the use of pyridine dyes of the formula Ia or Ib

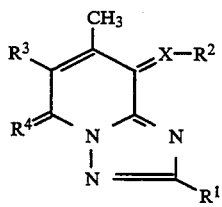

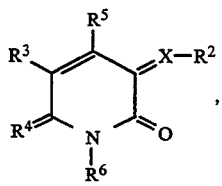

where
- $R^1$ is $C_1$–$C_{20}$-alkyl, which may be substituted and may be interrupted by one or more oxygen atoms in ether function, substituted or unsubstituted phenyl, or hydroxyl,
- $R^2$ is a 5- or 6-membered carbocyclic or heterocyclic radical which may be substituted and may be benzofused,
- $R^3$ is cyano, carbamoyl, carboxyl or $C_1$–$C_4$-alkoxycarbonyl,
- $R^4$ is oxygen or a radical of the formula $C(CN)_2$, $C(CN)COOL^1$ or $C(COOL^1)_2$, where $L^1$ is in either case $C_1$–$C_8$-alkyl, which may be interrupted by 1 or 2 oxygen atoms in ether function,
- $R^5$ is hydrogen or $C_1$–$C_4$-alkyl,
- $R^6$ is $C_1$–$C_{20}$-alkyl, which may be substituted and may be interrupted by one or more oxygen atoms in ether function, substituted or unsubstituted phenyl, hydroxyl or a radical of the formula $NL^2L^3$, where $L^2$ and $L^3$ are identical or different and each is independently of the other hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxycarbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or $L^2$ and $L^3$ are together with the nitrogen atom bonding them together unsubstituted or $C_1$–$C_4$-alkyl-substituted succinimido, unsubstituted or $C_1$–$C_4$-alkyl-substituted phthalimido or a five- or six-membered saturated heterocyclic radical which may contain further hetero atoms, and
- X is nitrogen or else—when $R^4$ is a radical of the formula $C(CN)_2$, $C(CN)COOL^1$ or $C(COOL^1)_2$—CH, for dyeing or printing synthetic fibers, cellulose esters or blends thereof, dye mixtures comprising pyridine dyes of the formula Ia or Ib and blue disperse dyes, the use thereof for dyeing or printing synthetic fibers, cellulose esters or blends thereof, and triazolopyridine dyes having a thienyl radical.

It is an object of the present invention to provide suitable compounds which are useful for dyeing or printing polyester in textile form. These compounds shall have advantageous application properties, in particular a high color strength and brilliance, and good performance characteristics.

It is a further object of the present invention to provide novel dye mixtures which likewise have the above-mentioned advantageous application properties.

It is a further object of the present invention to provide novel triazolopyridine dyes which have an advantageous application property profile.

We have found that these objects are achieved in that the above-defined pyridine dyes of the formula Ia or Ib are advantageously useful for dyeing or printing synthetic fibers, cellulose esters or blends thereof.

The dyes of the formula Ia or Ib can exist in a plurality of tautomeric forms, which are all encompassed by the claim. For example, the compounds of the formula Ia where $R^4$ = oxygen can exist inter alia in the following tautomeric forms:

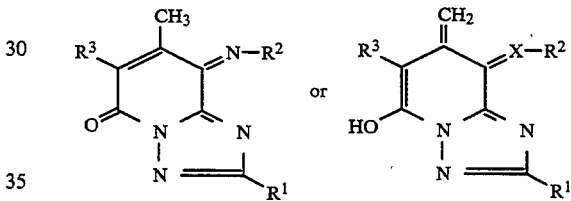

Any substituted alkyl appearing in the abovementioned formulae may for example have as substituents, unless otherwise mentioned, phenyl, $C_1$–$C_4$-alkylphenyl, $C_1$–$C_4$-alkoxyphenyl, halophenyl, $C_1$–$C_8$-alkanoyloxy, $C_1$–$C_8$-alkylaminocarbonyloxy, $C_1$–$C_{20}$-alkoxycarbonyl, $C_1$–$C_{20}$-alkoxycarbonyloxy, and in the last two the alkyl chain may be interrupted by from 1 to 4 oxygen atoms in ether function and/or may be phenyl- or phenoxy-substituted, halogen, hydroxyl or cyano. The number of substituents in substituted alkyl is in general 1 or 2.

In any alkyl appearing in the abovementioned formulae with interruption by oxygen atoms in ether function the number of oxygen atoms in ether function is preferably, unless otherwise stated, from 1 to 4, in particular 1 or 2.

Any substituted phenyl or pyridyl appearing the abovementioned formulae may for example have as substituents, unless otherwise stated, $C_1$–$C_8$-alkyl, $C_1$–$C_8$-alkoxy, halogen, in particular chlorine or bromine, or carboxyl. The number of substituents in substituted phenyl or pyridyl is in general from 1 to 3.

$R^2$ can be derived for example from components of the benzene, indole, quinoline, naphthalene, pyrrole, thiazole, benzimidazole, benzothiazole, thiophene or diaminopyridine series.

Important radicals $R^2$ are for example those of the formulae IIIa to IIIu

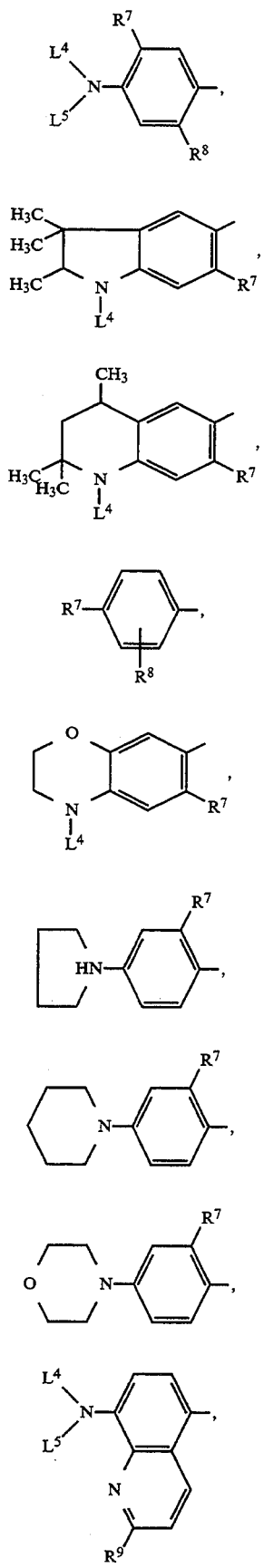
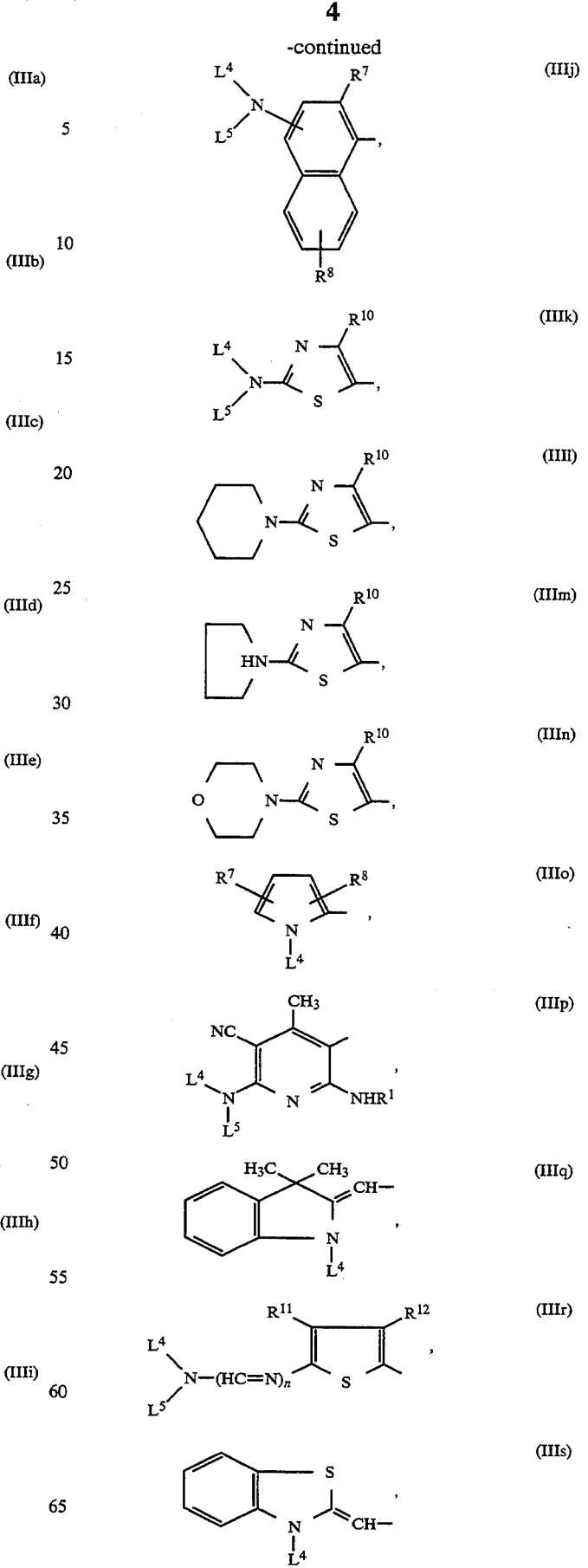

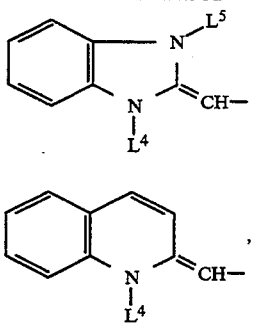

where
n is 0 or 1,
$L^4$ and $L^5$ are identical or different and each is independently of the other hydrogen or the abovementioned radical $R^1$,
$R^7$ and $R^8$ are identical or different and each is independently of the other hydrogen, hydroxyl, unsubstituted or phenyl- or $C_1$–$C_4$-alkylphenyl-substituted $C_1$–$C_8$-alkyl, unsubstituted or phenyl- or $C_1$–$C_4$-alkylphenyl-substituted $C_1$–$C_8$-alkoxy, $C_1$–$C_8$-alkanoylamino, $C_1$–$C_8$-alkylsulfonylamino or mono- or di($C_1$–$C_8$-alkyl) aminosulfonylamino,
$R^9$ is hydrogen or methyl,
$R^{10}$ is hydrogen, halogen, $C_1$–$C_8$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, thienyl, hydroxyl or mono- $C_1$–$C_8$-alkylamino,
$R^{11}$ is cyano, carbamoyl, mono- or di($C_1$–$C_8$-alkyl) carbamoyl, $C_1$–$C_8$-alkoxycarbonyl or substituted or unsubstituted phenyl, and
$R^{12}$ is halogen, hydrogen, $C_1$–$C_4$-alkyl, $C_1$–$C_4$-alkoxy, $C_1$–$C_4$-alkylthio, unsubstituted or $C_1$–$C_4$-alkyl- or $C_1$–$C_4$-alkoxy-substituted phenyl or thienyl.

Any alkyl appearing in the abovementioned formulae may be straight-chain or branched.

Suitable $R^1$, $R^5$, $R^6$, $R^7$, $R^8$, $R^{10}$, $R^{12}$, $L^1$, $L^2$ and $L^3$ are each for example, methyl, ethyl, propyl, isopropyl, butyl, isobutyl, sec-butyl or tert-butyl.

$R^1$, $R^6$, $R^7$, $R^8$, $R^{10}$, $L^1$, $L^2$ and $L^3$ may each also be for example pentyl, isopentyl, neopentyl, tert-pentyl, hexyl, 2-methylpentyl, heptyl, 1-ethylpentyl, octyl, 2-ethylhexyl or isooctyl.

$R^1$, $L^2$ and $L^3$ may each also be for example nonyl, isononyl, decyl, isodecyl, undecyl or dodecyl.

$R^1$ may also be for example tridecyl, isotridecyl, tetradecyl, pentadecyl, hexadecyl, heptadecyl, octadecyl, nonadecyl, eicosyl (the above designations isooctyl, isononyl, isodecyl and isotridecyl are trivial names derived from the oxo process alcohols—of. Ullmanns Encyklopädie der technischen Chemie, 4th edition, Volume 7, pages 215 to 217, and Volume 11, pages 435 and 436), 2-carboxyethyl, 2-methoxycarbonylethyl, benzyl, 1-or 2-phenylethyl, 3-benzyloxypropyl, phenoxymethyl, 6-phenoxy-4-oxahexyl, 8-phenoxy-4-oxaoctyl, 2-, 3- or 4-chlorophenyl or 2-, 3- or 4-carboxyphenyl.

$R^1$ and $L^1$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl or 4,8-dioxadecyl.

$R^1$ may also be for example 3,6,9-trioxadecyl, 3,6,9-trioxaundecyl, 3,6,9-trioxadodecyl, 3,6,9,12-tetraoxatridecyl, 3,6,9,12-tetraoxatetradecyl, 11-oxahexadecyl, 13-butyl-11-oxaheptadecyl or 4,11-dioxapentadecyl.

$R^3$, $R^{11}$, $L^2$ and $L^3$ are each for example methoxycarbonyl, ethoxycarbonyl, propoxycarbonyl, isopropoxycarbonyl, butoxycarbonyl, isobutoxycarbonyl or sec-butoxycarbonyl.

$R^{11}$ may also be for example mono- or dimethylcarbamoyl, mono- or diethylcarbamoyl, mono- or dipropylcarbamoyl, mono- or diisopropylcarbamoyl, mono- or dibutylcarbamoyl or N-methyl-N-butylcarbamoyl.

$R^7$, $R^8$ and $R^{12}$ may each also be for example methoxy, ethoxy, propoxy, isopropoxy, butoxy, isobutoxy or sec-butoxy.

$R^{12}$ may also be for example methylthio, ethylthio, propylthio, isopropylthio, butylthio, isobutylthio or sec-butylthio.

$R^1$, $R^{10}$, $R^{12}$, $L^2$ and $L^3$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl or 2,4-dimethoxyphenyl.

$R^1$, $L^2$ and $L^3$ may each also be for example 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonyl 2-methoxycarbonyloxyethyl, 2- or 3-methoxycarbonyloxypropyl, 2-ethoxycarbonyloxyethyl, 2- or 3ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$L^2$ and $L^3$ may each also be for example pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl, thien-3-ylcarbonyl, cyclopentyl, cyclohexyl or cycloheptyl.

$L^2$ and $L^3$ combined with the nitrogen atom joining them together to form a five- or six-membered saturated heterocyclic radical which may contain further hetero atoms can be for example pyrrolidinyl, piperidinyl, morpholinyl, piperazinyl or N-($C_1$–$C_4$-alkyl)piperazinyl.

Preference is given to the use of pyridine dyes of the formula Ia or Ib where $R^3$ is cyano.

Preference is further given to the use of pyridine dyes of the formula Ia or Ib where $R^2$ is derived from a component of the benzene, indole, quinoline, naphthalene, pyrrole, thiazole, benzimidazole, benzothiazole, thiophene or diaminopyridine series.

Preference is further given to the use of pyridine dyes of the formula Ia or Ib where $R^1$ or $R^6$ is $C_1$–$C_{12}$-alkyl, which may be substituted by $C_1$–$C_6$-alkanoyloxy, $C_1$–$C_8$-alkoxycarbonyl, whose alkyl chain may be interrupted by 1 or 2 oxygen atoms in ether function, phenyl or $C_1$–$C_4$-alkylphenyl and may be interrupted by 1 or 2 oxygen atoms in ether function.

Particular preference is given to the use of pyridine dyes of the formula Ia or Ib where $R^1$ or $R^6$ is alkyl, alkoxyalkyl, alkanoyloxyalkyl or alkoxycarbonylalkyl, each of which has up to 12 carbon atoms, unsubstituted or methyl-substituted benzyl or unsubstituted or methyl-substituted phenyl.

Particular preference is further given to the use of pyridine dyes of the formula Ia or Ib where $R^2$ is a radical of the abovementioned formula IIIa, IIIc, IIIk, IIIl, IIIm, IIIn or IIIr where

- $L^4$ and $L^5$ are each independently of one another alkyl, alkoxyalkyl, alkanoyloxyalkyl or alkoxycarbonylalkyl, which may each have up to 12 carbon atoms, hydrogen, unsubstituted or methyl-substituted benzyl or unsubstituted or methyl-substituted phenyl,
- $R^7$ and $R^8$ are each independently of the other hydrogen, $C_1$–$C_4$-alkyl, $C_1$–$C_4$-alkoxy or $C_1$–$C_8$-alkanoylamino,
- $R^{10}$ is hydrogen, $C_1$–$C_4$-alkyl, unsubstituted or $C_1$–$C_4$-alkyl- or $C_1$–$C_4$-alkoxy-substituted phenyl, benzyl or thienyl,
- $R^{11}$ is cyano,
- $R^{12}$ is halogen, hydrogen, $C_1$–$C_4$-alkyl, $C_1$–$C_4$-alkoxy, $C_1$–$C_4$-alkylthio, unsubstituted or $C_1$–$C_4$-alkyl-substituted phenyl or thienyl, and
- n is 0.

Attention is drawn in particular to the use of pyridine dyes of the formula Ia.

The dyes of the formula Ia and Ib are known per se; see for example U.S. Pat. No. 5,079,365. There it is stated that they are advantageous for the thermal diffusion transfer process.

In the non-textile thermal diffusion transfer printing process, a transfer sheet which contains on a substrate a thermally transferable dye in one or more binders with or without suitable assistants is heated from the back by an energy source, for example a laser or a thermal head, in short pulses (duration: fractions of a second), which causes the dye to migrate out of the transfer sheet and to diffuse into the surface coating or plastic-coated paper.

No indication is given there of the use of pyridines Ia and Ib in the textile sector. Nor was it foreseeable that such methine dyes would be suitable for that purpose.

The present invention further provides dye mixtures comprising one or more pyridine dyes of the formula Ia or Ib

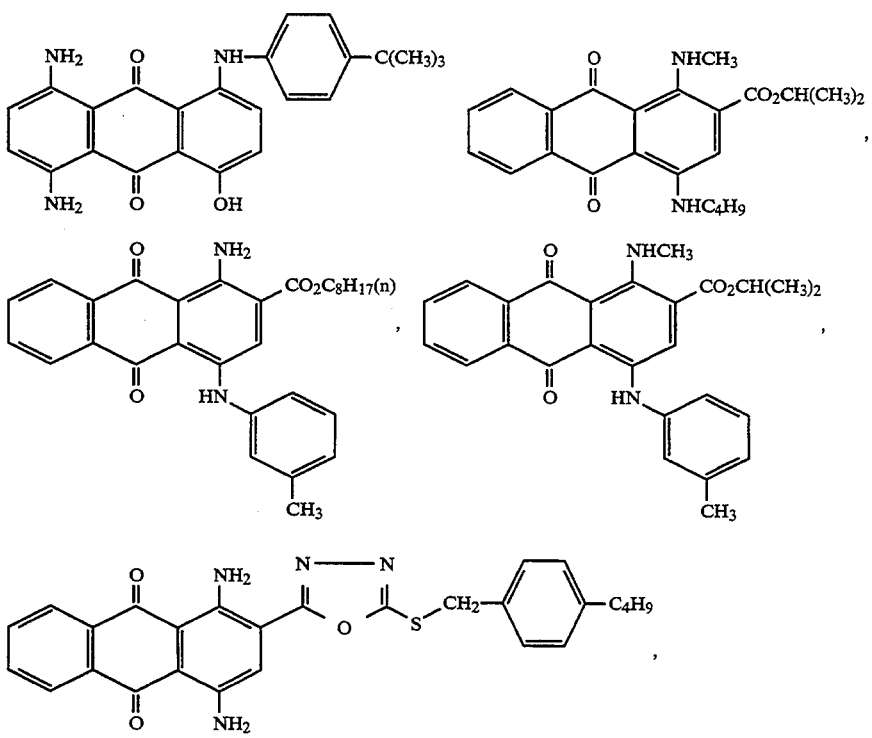

where $R^1$, $R^2$, $R^3$, $R^4$, $R^5$ and $R^6$ and X are each as defined above, and one or more blue disperse dyes of the class of the azo, methine or anthraquinone dyes whose color locus is under CIELAB (in accordance with ISO 7724-3-1984) within the following domain: hue: 240–280 and chroma: >35, provided that dye mixtures consisting of a pyridine dye of the formula Ia and an anthraquinone dye of the formula

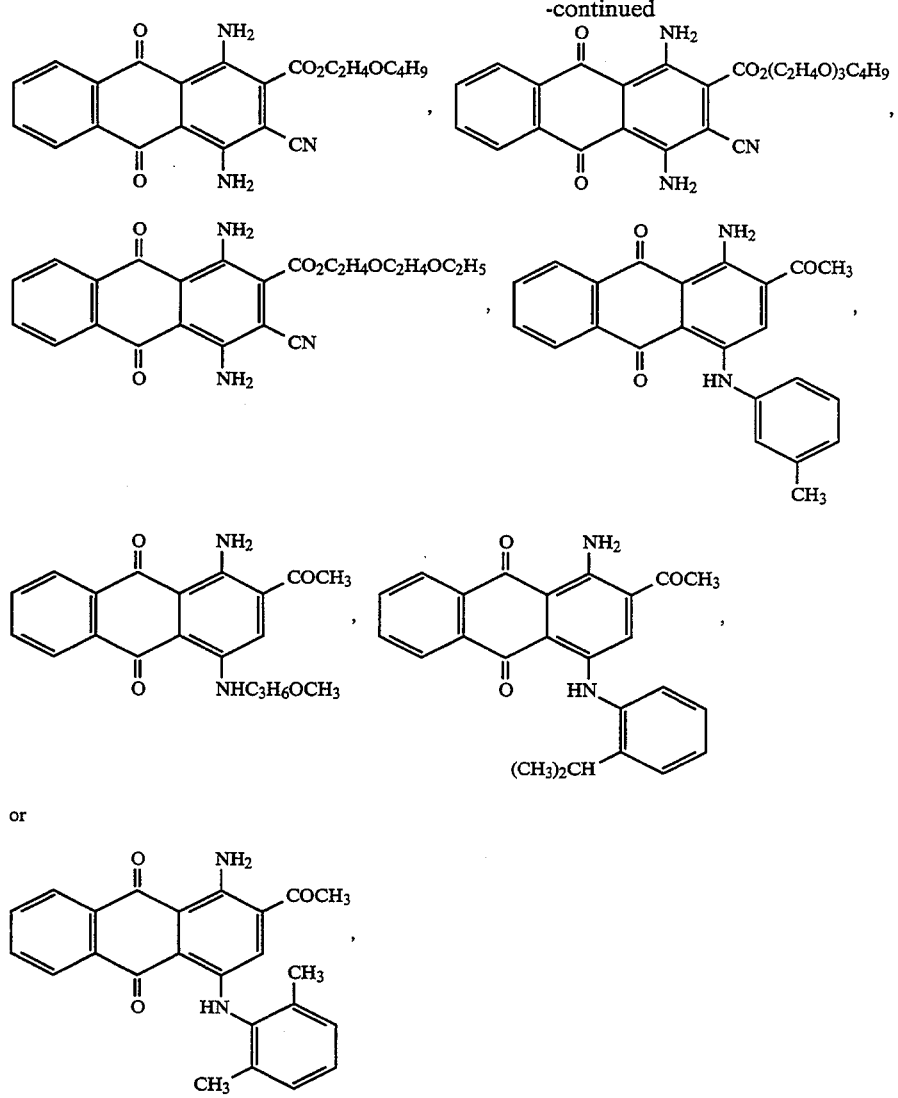

and dye mixtures consisting of the dyes of the formulae

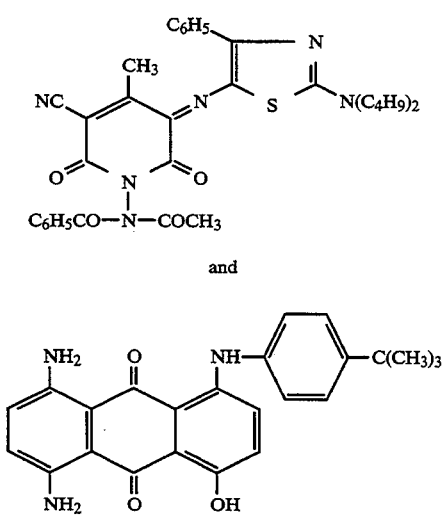

and shall be excluded.

The above-excluded dye mixtures are described in the earlier European Patent Application No. 93 106 938.9.

Preference is given to dye mixtures comprising one or more pyridine dyes of the formula Ia or Ib where X is nitrogen, Preference is further given to dye mixtures comprising one or more pyridine dyes of the formula Ia or Ib where $R^3$ is cyano.

Preference is further given to dye mixtures comprising one or more pyridine dyes of the formula Ia or where $R^2$ is derived from a component of the benzene, indole, quinoline, naphthalene, pyrrole, thiazole, benzimidazole, benzothiazole, thiophene or diaminopyridine series.

Preference is further given to dye mixtures comprising one or more pyridine dyes of the formula Ia or Ib where. $R^1$ or $R^6$ is $C_1-C_{12}$-alkyl, which may be substituted by $C_1-C_6$-alkanoyloxy, $C_1-C_8$-alkoxycarbonyl, whose alkyl chain may be interrupted by 1 or 2 oxygen atoms in ether function, phenyl or $C_1-C_4$-alkylphenyl and may be interrupted by 1 or 2 oxygen atoms in ether function.

Particular preference is given to dye mixtures comprising one or more pyridine dyes of the formula Ia or Ib where $R^1$ or $R^6$ is alkyl, alkoxyalkyl, alkanoyloxyalkyl or alkoxycarbonylalkyl, each of which has up to 12 carbon atoms, unsubstituted or methyl-substituted benzyl or unsubstituted or methyl-substituted phenyl.

Particular preference is further given to dye mixtures comprising one or more pyridine dyes of the formula Ia or Ib where $R^2$ is a radical of the abovementioned formula IIIa, IIIc, IIIk, IIII, IIIm, IIIn or IIIr where $L^4$ and $L^5$ are each independently of one another alkyl, alkoxyalkyl, alkanoyloxyalkyl or alkoxycarbonylalkyl, which may each have up to 12 carbon atoms, hydrogen, unsubstituted or methyl-substituted benzyl or unsubstituted or methyl-substituted phenyl, $R^7$ and $R^8$ are each independently of the other hydrogen, $C_1$-$C_4$-alkyl, $C_1$-$C_4$-alkoxy or $C_1$-$C_8$-alkanoylamino, $R^{10}$ is hydrogen, $C_1$-$C_4$-alkyl, unsubstituted or $C_1$-$C_4$-alkyl- or $C_1$-$C_4$-alkoxy-substituted phenyl, benzyl or thienyl, $R^{11}$ is cyano, $R^{12}$ is halogen, hydrogen, $C_1$-$C_4$-alkyl, $C_1$-$C_4$-alkoxy, $C_1$-$C_4$-alkylthio, unsubstituted or $C_1$-$C_4$-alkyl-substituted phenyl or thienyl, and n is 0.

Attention is drawn in particular to dye mixtures containing a pyridine dye of the formula Ia.

Preference is given to dye mixtures containing one or more blue disperse dyes of the class of the azo or anthraquinone dyes.

Particular preference is given to dye mixtures containing one or more blue disperse dyes of the class of the 1,8-dihydroxy-4,5-diaminoanthraquinones, 1,5-dihydroxy-4,8-diaminoanthraquinones, 1,4-diaminoanthraquinonedicarboximides, 1,4-diaminoanthraquinonedicarboximinoimides, thienylazo dyes, benzisothiazolazo dyes or cyanophenylazo dyes.

Suitable 1,8-dihydroxy-4,5-diaminoanthraquinones or 1,5-dihydroxy-4,8-diaminoanthraquinones conform for example to the formula IV (IV)

where one of the two radicals $Y^1$ and $Y^2$ is hydroxyl and the other is amino and $y^3$ is methyl, ethyl, 2-hydroxyethyl, hydroxyphenyl, $C_1$-$C_4$-alkoxyphenyl, acetyloxyphenyl, chlorine or bromine.

Suitable 1,4-diaminoanthraquinonedicarboximides or 1,4-diaminoanthraquinonedicarboximinoimides conform for example to the formula V (V)

where $Q^1$ $C_1$-$C_{10}$-alkyl, which may be interrupted by 1 or 2 oxygen atoms in ether function and may be $C_1$-$C_8$-alkoxycarbonyl-, hydroxy- or phenyl-substituted, and Z is oxygen or imino.

Suitable thienylazo dyes conform for example to the formula VI (VI)

where $Q^2$ is formyl, cyano or nitro, $Q^3$ is hydrogen, chlorine or bromine, $Q^4$ is cyano or acetyl, E is hydrogen or $C_1$-$C_4$-alkoxy, W is hydrogen, $C_1$-$C_4$-alkyl, $C_1$-$C_4$-alkoxy, unsubstituted or halogen-, cyano-, hydroxyl-, $C_1$-$C_4$-alkoxy- or $C_1$-$C_4$-alkanoyloxy-substituted $C_1$-$C_8$-alkanoylamino or $C_3$-$C_4$-alkenoylamino, and $Q^5$ and $Q^6$ are identical or different and each is independently of the other hydrogen or $C_1$-$C_6$-alkyl which may be hydroxyl-, $C_1$-$C_4$-alkoxy-, $C_1$-$C_4$-alkanoyloxy- or $C_1$-$C_4$-alkoxycarbonyl-substituted, or $C_3$-$C_5$-alkenyl.

Suitable benzisothiazolazo dyes conform for example to the formula VII (VII)

where are E, W, $Q^5$ and $Q^6$ are each as defined above.

Suitable cyanophenylazo dyes conform for example to the formula VIII (VIII)

where $Q^7$ is cyano or nitro and E, W, $Q^5$ and $Q^6$ are each as defined above.

Any alkyl appearing in the abovementioned formulae V, VI, VII and VIII may be straight-chain or branched.

Substituted alkyl is in general monosubstituted or disubstituted.

$Q^1$ is for example methyl, ethyl, propyl, isopropyl, butyl, isobutyl, sec-butyl, tert-butyl, pentyl, isobutyl, neopentyl, tert-pentyl, hexyl, 2-methylpentyl, heptyl, 2-methylhexyl, octyl, 2-ethylhexyl, nonyl, decyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-isopropoxypropyl, 2- or 3-butoxypropyl, 2- or 4-methoxybutyl, 2- or 4-ethoxybutyl, 3,6-dioxaheptyl, 3,6-dioxaoctyl, 4,7-dioxaoctyl, 4,7-dioxanonyl, 2-hydroxyethyl, 2- or 3-hydroxypropyl, 2- or 4-hydroxybutyl, benzyl, 1- or 2-phenylethyl, 3-phenylpropyl or 2,3-diphenylpropyl.

$Q^1$ may also be for example, like $Q^5$ and $Q^6$, 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-isopropoxycarbonylpropyl, 2- or 3-butoxycarbonylpropyl, 2- or 4-methoxycarbonylbutyl or 2- or 4-ethoxycarbonylbutyl.

E and W are each for example methoxy, ethoxy, propoxy, isopropoxy, butoxy, isobutoxy or sec-butoxy.

W, $Q^5$ and $Q^6$ may each also be for example methyl, ethyl, propyl, isopropyl, butyl, isobutyl or sec-butyl.

W may also be for example acetylamino, propionylamino, butyrylamino, isobutyrylamino, 2-ethylhexanoylamino, methoxyacetylamino, ethoxyacetylamino, 2- or 3-methoxypropionylamino, chloroacetylamino, cyanoacetylamino, hydroxyalkylamino, acetyloxyacetylamino, acryloylamino or methacryloylamino $Q^5$ and $Q^6$ may each also be for example pentyl, isopentyl, neopentyl, hexyl, 2-hydroxyethyl, 2- or 3-hydroxypropyl, 2- or 4-hydroxybutyl, 2-methoxyethyl, 2-ethoxyethyl, 2- or 3-methoxypropyl, 2- or 3-ethoxypropyl, 2- or 4-methoxybutyl, 2- or 4-ethoxybutyl, 2-acetyloxyethyl, 2- or 3-acetyloxypropyl, allyl or methylallyl.

Attention is drawn in particular to those dye mixtures which contain one or more dyes of the formula V where
$Q^1$ is $C_1$-$C_8$-alkyl or in particular $C_1$-$C_8$-alkyl which is interrupted by 1 or 2 oxygen atoms in ether function, and
Z is oxygen.

Attention is drawn in particular to those dye mixtures which contain one or more dyes of the formula VI where
$Q^2$ is formyl or cyano,
$Q^4$ is cyano,
$Q^3$ is chlorine,
E is hydrogen,
W is $C_1$-$C_4$-alkyl or unsubstituted or methoxy- or ethoxy-substituted acetylamino or propionylamino, and
$Q^5$ and $Q^6$ are each independently of the other $C_1$-$C_4$-alkyl which may be hydroxyl- or $C_1$-$C_4$-alkoxy-substituted.

The dye mixtures of the invention generally contain from 5 to 60% by weight, preferably from 30 to 60% by weight, in particular from 40 to 50% by weight, each percentage being based on the weight of the mixture, of one or more pyridine dyes of the formula Ia or Ib and from 40 to 95% by weight, preferably from 40 to 70% by weight, in particular from 50 to 60% by weight, each percentage being based on the weight of the mixture, of one or more blue anthraquinone dyes, preferably those of the class of the 1,8-dihydroxy-4,5-diaminoanthraquinones, 1,5-dihydroxy-4,8-diaminoanthraquinones, 1,4-diaminoanthraquinonedicarboximides or 1,4-diaminoanthraquinonedicarboximinoimides, in particular those of the formula IV or V.

In the case of azo dyes the dye mixtures of the invention generally contain from 20 to 80% by weight, preferably from 35 to 80% by weight, in particular from 50 to 80% by weight, each percentage being based on the weight of the mixture, of one or more pyridine dyes of the formula Ia or Ib and from 20 to 80% by weight, preferably from 20 to 65% by weight, in particular from 20 to 50% by weight, each percentage being based on the weight of the mixture, of one or more blue azo dyes, preferably those of the class of the thienylazo dyes, in benzisothiazolazo dyes, or dicyanophenylazo dyes, particular those of the formula VI, VII or VIII, of which thienylazo dyes, in particular those of the formula VI, are particularly to be emphasized.

It is also possible to have mixtures which as well as from 30 to 50% by weight, based on the weight of the mixture, of one or more pyridine dyes of the formula Ia or Ib contain from 50 to 70% by weight, based on the weight of the mixture, of one or more blue anthraquinone dyes and of one or more blue azo dyes.

The dyes of the formulae IV, V, VI, VII and VIII are in general known dyes. Dyes of the formula IV are known for example from Ullmann's Encyclopedia of Industrial Chemistry, 5th edition, Volume A2, pages 399 to 401. Dyes of the formula V are described for example in U.S. Pat. Nos. 2,628,963, 3,835,154, DE-B-1 266 425 or DE-A-2 016 794. Dyes of the formula VI are known for example from EP-A-201 896. Dyes of the formula VII are known for example from U.S. Pat. Nos. 4,465,628, 4,722,737 or 4,773,915. Dyes of the formula VIII are known for example from DE-A-1 544 563.

The preparation of the dye mixtures of the invention is effected in a conventional manner, for example by mixing the respective dye components in the stated weight ratio. If desired, the novel mixtures may include other kinds of components, for example dispersants, such as ligninsulfonates or sulfonation products of the reaction product of formaldehyde with aromatics, thickeners or other assistants. It is also possible to mix ready-prepared dye preparations of the respective dye components or ready-prepared dye preparations with pure dyes.

The dye mixtures of the invention and the pyridine dyes of the formula Ia or Ib can advantageously be employed in the form of a dye preparation. Such dye preparations generally contain from 15 to 60% by weight, based on the weight of the dye preparation, of an abovedefined dye mixture of the invention or one or more pyridine dyes of the formula Ia or Ib and from 40 to 85% by weight, based on the weight of the dye preparation, of a dispersant with or without further assistants.

The dye mixtures of the invention and the pyridine dyes of the formula Ia or Ib are advantageous for dyeing or printing, in particular dyeing or direct printing, synthetic fibers, cellulose esters or blends thereof.

Synthetic fibers for the purposes of the present invention are in particular polyester or polyamide, for example in the form of fibers or fabrics, including blend fabrics of polyesters with cotton, wool, cellulose acetate or triacetate. Cellulose esters for the purposes of the present invention are in particular cellulose triacetate and cellulose acetate. The dyeings or prints obtained have blue shades.

The dyeing and printing processes are known per se. In contradistinction to textile transfer printing, where the dye is applied from a transfer by sublimation, in direct printing the print paste containing the dye mixture is applied directly.

The dye mixtures of the invention combine brilliance, lightfastness and color strength with high affinity.

The pyridine dyes of the formula Ia or Ib used according to the invention have good dyeing properties and high compatibility.

The present invention further provides triazoiopyridine dyes of the formula II

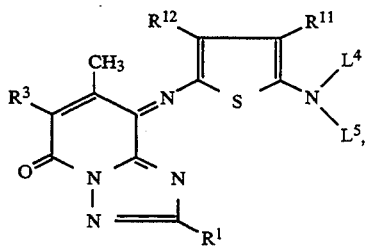
(II)

where

R¹ is $C_1$–$C_{20}$-alkyl, which may be substituted and may be interrupted by one or more oxygen atoms in ether function, substituted or unsubstituted phenyl, or hydroxyl, R³ is cyano, carbamoyl, carboxyl or $C_1$–$C_4$-alkoxycarbonyl, R¹¹ is cyano, carbamoyl, mono- or di($C_1$–$C_8$-alkyl)-carbamoyl or substituted or unsubstituted phenyl, R¹² is halogen, $C_1$–$C_4$-alkyl, $C_1$–$C_4$-alkoxy, $C_1$–$C_4$-alkylthio, unsubstituted or $C_1$–$C_4$-alkyl- or $C_1$–$C_4$-substituted phenyl or thienyl, and L⁴ and L⁵ are identical or different and each is independently of the other hydrogen or else, except for hydroxyl, the abovementioned radical R¹, but not the dye of the formula

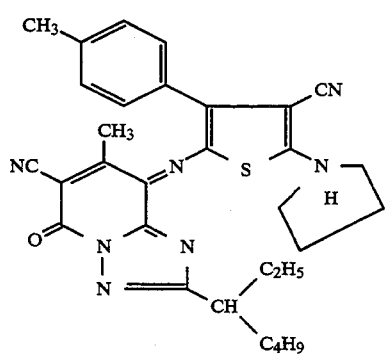

The above-excluded dye is described in the earlier German Patent Application P 42 15 536.3.

The novel triazolopyridine dyes of the formula II can be obtained in a conventional manner, for example as described in U.S. Pat. No. 5,079,365.

For example, a nitrosothienyl compound of the formula IX

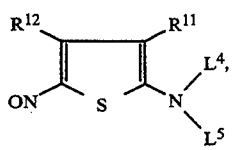
(IX)

where R¹¹, R¹², L⁴ and L⁵ are each as defined above, can be condensed with a triazolopyridine of the formula X

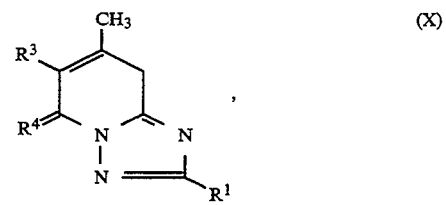
(X)

where R¹, R³ and R⁴ are each as defined above.

As mentioned earlier, the novel triazolopyridine dyes of the formula II are advantageous for dyeing or printing synthetic fibers, cellulose esters or blends thereof, for preparing the dye mixtures of the invention and for the thermal diffusion transfer process described in U.S. Pat. No. 5,079,365.

The invention will now be more particularly described by way of Examples.

Dyeing method 5 g of polyester fabric are introduced at room temperature into 100 ml of a dyeing liquor containing 0.5% by weight, based on the polyester fabric, of a dye mixture or of an individual dye and 0.2 g of a dispersant based on a condensation product of formaldehyde with aromatic sulfonic acids and whose pH has been set to 4.5 with acetic acid/sodium acetate. The temperature of the liquor is raised for 30 minutes to 130° C., held at that temperature for 60 minutes and then reduced over 20 minutes to 70° C.

Thereafter the dyed polyester fabric is reduction cleared by treating it for 15 minutes at 70° C. in 200 ml of a liquor containing per liter 5 ml of 32% strength by weight sodium hydroxide solution, 3 g of sodium dithionite and 1 g of an addition product of 48 mol of ethylene oxide with 1 mol of castor oil. Finally the fabric is rinsed, neutralized with dilute acetic acid, rinsed once more and dried.

The following dyes were used:

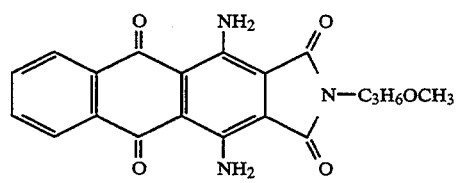
Dye 1

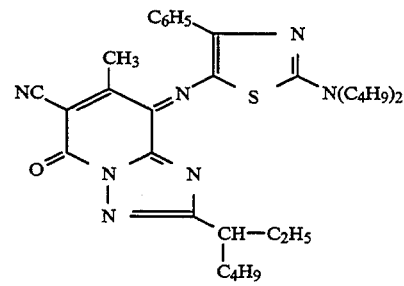
Dye 2

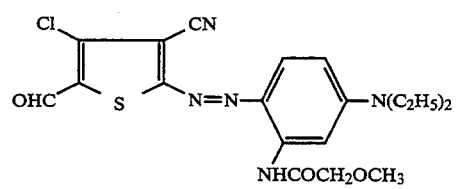
Dye 3

Dye 4

[structure: pyridone-thiophene azo dye with C6H5, CN, CH3, NC, N(C4H9)2, S, and CH(C2H5)(C4H9) substituents]

Dye 5

[1,5-diamino-4,8-dihydroxy-Br-anthraquinone structure with NH2, OH, O, Br substituents]

Dye 6

$O_2N$—[phenyl with CN, CN]—N=N—[phenyl with NHCOCH3]—N(C2H5)2

Dye 8

[anthraquinone structure with OH, NH2, O-phenyl-OH, NH2, OH substituents]

Dye 9

$O_2N$—[phenyl with CN, NO2]—N=N—[phenyl with NHCOCH3]—N(C2H5)2

Dye 10

$O_2N$—[phenyl with CN, CN]—N=N—[phenyl with CH3]—N(C2H5)2

Dye 11

$O_2N$—[thiophene with COCH3]—N=N—[phenyl with CH3]—N(C2H5)(C4H8OCOCH3)

Dye 12

[pyridone structure with C6H5, CH3NH—OC, N, N(C4H9)2, O, O, CH3 substituents]

The mixtures indicated below in the Table were used for preparing dyeings in accordance with the above method.

| Ex. No. | Dye No. [% by weight, based on the dye mixture] | | | | | |
|---|---|---|---|---|---|---|
| 1 | 1 | 0.264 | 2 | 0.102 | | |
| 2 | 3 | 0.043 | 2 | 0.102 | | |
| 3 | 3 | 0.054 | 4 | 0.110 | | |
| 4 | 1 | 0.264 | 4 | 0.132 | | |
| 5 | 1 | 0.198 | 2 | 0.102 | 3 | 0.011 |
| 6 | 5 | 0.120 | 2 | 0.102 | | |
| 7 | 5 | 0.120 | 4 | 0.132 | | |
| 8 | 6 | 0.063 | 4 | 0.110 | | |
| 9 | 6 | 0.075 | 2 | 0.068 | | |
| 10 | 7 | 0.060 | 4 | 0.110 | | |
| 11 | 7 | 0.072 | 2 | 0.068 | | |
| 12 | 12 | 0.084 | 1 | 0.264 | | |
| 13 | 12 | 0.084 | 5 | 0.120 | | |

On polyester the dye mixtures produce blue dyeings of high brilliance with good manufacturing and performance characteristics.

Very good results are also obtained with mixtures containing on the one hand dye 8, 9, 10 and 11 and on the other dye 2, 4 or 12.

Another highly suitable azo dye for preparing dye mixtures is the dye of the formula

[benzisothiazole azo dye structure: $O_2N$—[benzisothiazole with N, S]—N=N—[phenyl with NHCOCH3]—N(C2H4OCH3)2]

EXAMPLES 14 TO 17

Dyes 2, 4 and 12 were applied as individual dyes. They all produced blue dyeings having good application properties.

EXAMPLE 18

8.35 g of 2-N,N-dibutylamino-3-cyano-4-phenythiophene were added to a mixture of 100 ml of water, 50 ml of concentrated hydrochloric acid, 150 ml of acetic acid and 200 ml of ethyl acetate. The mixture was cooled down to 0°–5° C., and then 10 ml of 23% strength by weight aqueous sodium nitrite solution were added dropwise. After stirring at 0°–5° C. for one hour the mixture was brought to pH 7 with 25% strength by weight aqueous ammonia, and the resulting nitroso compound was extracted with 200 ml of ethyl acetate.

This extract was added to a suspension of 6.8 g of the compound of the formula

[pyridone structure with CH3, NC, O, N, N, CH(C2H5)(C4H9) substituents]

in 20 ml of acetic anhydride. Then ethyl acetate was distilled off until the internal temperature was 100° C. The reaction mixture was left to stand at room temperature for 12 hours and the resulting dye precipitate of the formula

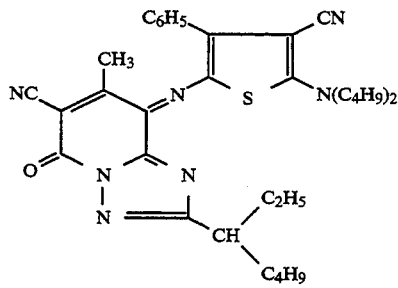

was filtered off with suction, washed with water and methanol and dried at 75° C. under reduced pressure. Yield: 10.95 g (73.6% of theory).

The same method can be used for obtaining the following compounds of the formula

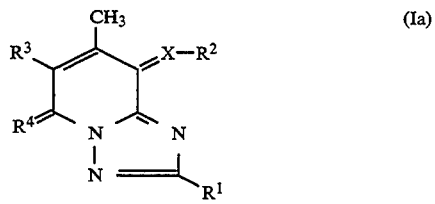

| Ex. No. | $B^1$ | $B^2$ | $B^3$ |
|---|---|---|---|
| 19 | CH(C₂H₅)(C₄H₉) | C₆H₅ | N(C₂H₅)₂ |
| 20 | CH(C₂H₅)(C₄H₉) | CH₃O-C₆H₄- | N(C₄H₉)₂ |
| 21 | CH(C₂H₅)(C₄H₉) | CH₃O-C₆H₄- | N(C₂H₅)₂ |
| 22 | CH(C₂H₅)(C₄H₉) | thienyl | N(C₄H₉)₂ |
| 23 | CH(C₂H₅)(C₄H₉) | thienyl | N(C₄H₉)₂ |
| 24 | CH(C₂H₅)(C₄H₉) | C₆H₅ | CH(C₂H₅)(C₂H₄OCH₃) |

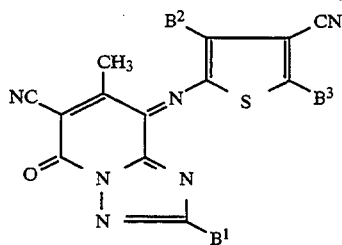

| Ex. No. | $B^1$ | $B^2$ | $B^3$ |
|---|---|---|---|
| 25 | CH(C₂H₅)(C₄H₉) | C₆H₅ | N(C₂H₄OCH₃)₂ |
| 26 | CH(CH₃)₂ | C₆H₅ | N(C₂H₅)₂ |
| 27 | CH(CH₃)₂ | C₆H₅ | N(C₄H₉)₂ |
| 28 | C(CH₃)₃ | C₆H₅ | N(C₂H₅)₂ |
| 29 | C(CH₃)₃ | C₆H₅ | N(C₄H₉)₂ |

We claim:

1. A method of dyeing or printing which comprises applying pyridine dyes of the formula Ia or Ib to synthetic fibers cellulose ester fiber or bends thereof from a dyeing liquor or paste, the formulae Ia and Ib being

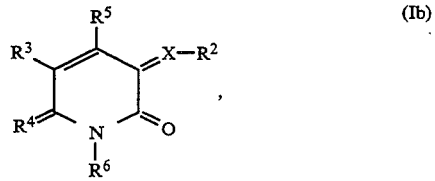

where
$R^1$ is $C_1$-$C_{20}$-alkyl, which may be substituted and may be interrupted by one or more oxygen atoms in ether function, substituted or unsubstituted phenyl, or hydroxyl, $R^2$ is a 5- or 6-membered carbocyclic or heterocyclic radical which may be substituted and may be benzofused, $R^3$ is cyano, carbamoyl, carboxyl or $C_1$-$C_4$-alkoxycarbonyl $R_4$ is oxygen or a radical of the formula $C(CN)_2$, $C(CN)COOL^1$ or $C(COOL^1)_2$, where $L^1$ is in either case $C_1$-$C_8$-alkyl, which may be interrupted by 1 or 2 oxygen atoms in ether function, $R^5$ is hydrogen or $C_1$-$C_4$-alkyl, $R^6$ is $C_1$-$C_{20}$-alkyl, which may be substituted and may be interrupted by one or more oxygen atoms in ether function, substituted or unsubstituted phenyl, hydroxyl or a radical of the formula $NL^2L^3$, where $L^2$ and $L^3$ are identical or different and each is independently of the other hydrogen, substituted or unsubstituted $C_1$-$C_{12}$-alkyl, $C_5$-$C_7$-cycloalkyl, substituted or unsubstituted phenyl, substituted or unsubstituted pyridyl, substituted or unsubstituted $C_1$-$C_{12}$-alkanoyl, $C_1$-$C_{12}$-alkoxycarbonyl, substituted or unsubstituted $C_1$-$C_{12}$-alkylsulfonyl, $C_5$-$C_7$-cycloalkyl sulfonyl, substituted or unsubstituted phenylsulfonyl, substituted or unsubstituted propylsulfonyl, substituted or unsubstituted benzoyl, pyridylcarbonyl or thienylcarbonyl, or $L^2$ and $L^3$ are together with the nitrogen atom bonding them together unsubstituted or $C_1$-$C_4$-alkyl-substituted succinimido, unsubstituted or $C_1$-$C_4$-alkyl-substituted phthalimido or a five- or six-membered saturated heterocyclic radical which may contain further hetero atoms, and X is nitrogen or else—when $R^4$ is a radical of the formula $C(CN)_2$, $C(CN)COOL^1$ or $C(COOL^1)_2$—CH.

2. A method as claimed in claim 1, wherefor $R^3$ is cyano.

3. A method as claimed in claim 1, wherefor $R^2$ is derived from a component of the benzene, indole, quinoline, naphthalene, pyrrole, thiazole, benzimidazole, benzothiazole, thiophene or diaminopyridine series.

4. Dye mixtures comprising (a) one or more pyridine dyes of the formula Ia or Ib

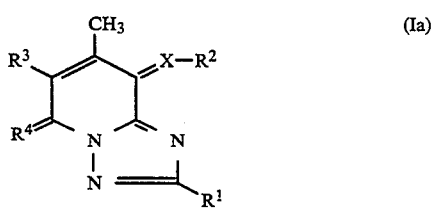

(Ia)

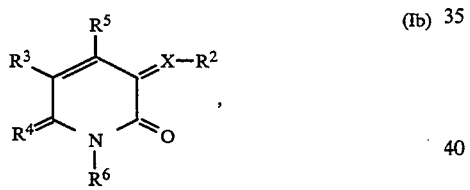

(Ib)

where $R^1$ is $C_1$-$C_{20}$-alkyl, which may be substituted and may be interrupted by one or more oxygen atoms in ether function, substituted or unsubstituted phenyl, or hydroxyl, $R^2$ is a 5- or 6-membered carbocyclic or heterocyclic radical which may be substituted and may be benzofused, $R^3$ is cyano, carbamoyl, carboxyl or $C_1$-$C_4$-alkoxycarbonyl, $R^4$ is oxygen or a radical of the formula $C(CN)_2$, $C(CN)COOL^1$ or $C(COOL^1)_2$, where $L^1$ is in either case $C_1$-$C_8$-alkyl, which may be interrupted by 1 or 2 oxygen atoms in ether function, $R^5$ is hydrogen or $C_1$-$C_4$-alkyl, $R^6$ is $C_1$-$C_{20}$-alkyl, which may be substituted and may be interrupted by one or more oxygen atoms in ether function, substituted or unsubstituted phenyl, hydroxyl or a radical of the formula $NL^2L^3$, where $L^2$ and $L^3$ are identical or different and each is independently of the other hydrogen, substituted or unsubstituted $C_1$-$C_{12}$-alkyl, $C_5$-$C_7$-cycloalkyl, substituted or unsubstituted phenyl, substituted or unsubstituted pyridyl substituted or unsubstituted $C_1$-$C_{12}$-alkanoyl, $C_1$-$C_{12}$-alkoxycarbonyl, substituted or unsubstituted $C_1$-$C_{12}$-alkylsulfonyl, $C_5$-$C_7$-cycloalkyl sulfonyl, substituted or unsubstituted phenylsulfonyl, substituted or unsubstituted propylsulfonyl, substituted or unsubstituted benzoyl, pyridylcarbonyl or thienylcarbonyl, or $L^2$ and $L^3$ are together with the nitrogen atom bonding them together unsubstituted or $C_1$-$C_4$-alkyl-substituted succinimido, unsubstituted or $C_1$-$C_4$-alkyl-substituted phthalimido or a five- or six-membered saturated heterocyclic radical which may contain further hetero atoms, and X is nitrogen or else—when $R^4$ is a radical of the formula $C(CN)_2$, $C(CN)COOL^1$ or $C(COOL^1)_2$—CH, and (b) one or more blue disperse dyes of the class of the (b1) azo or (b2) anthraquinone dyes whose color locus is under CIELAB (in accordance with ISO 7724-3-1984) within the following domain: hue: 240-280 and chroma:>35, in the weight proportions of 20 to 80% of pyridine dye (a) and 20 to 80% of the azo dye (b1) or 5 to 60% of pyridine dye (a) and 40 to 95% of blue anthraquinone dye (b2), provided that dye mixtures consisting of a pyridine dye of the formula Ia and an anthraquinone dye of the formula

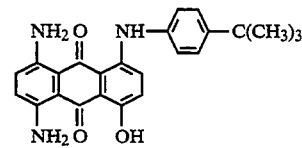

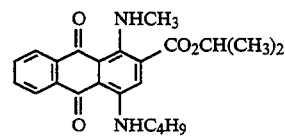

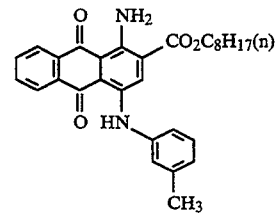

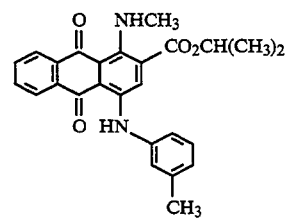

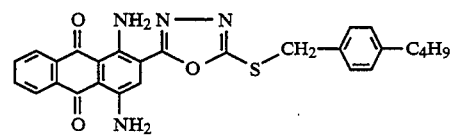

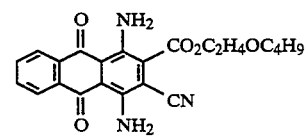

-continued

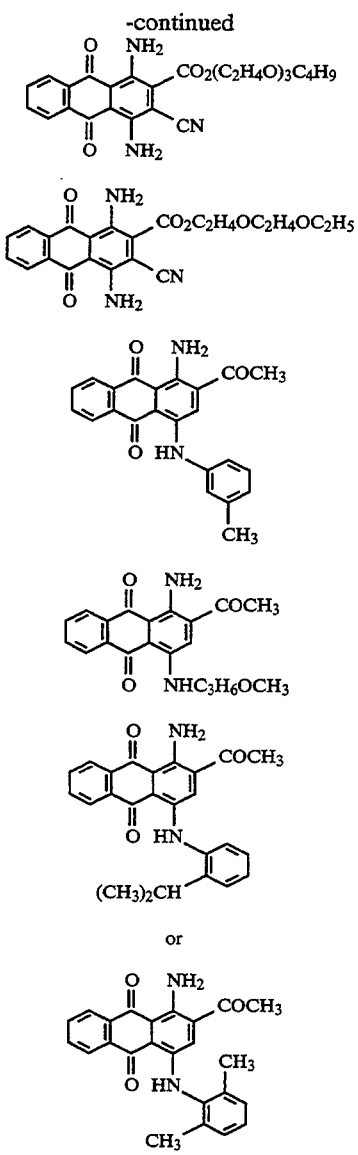

and dye mixtures consisting of the dyes of the formulae

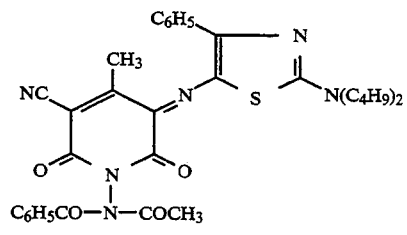

and

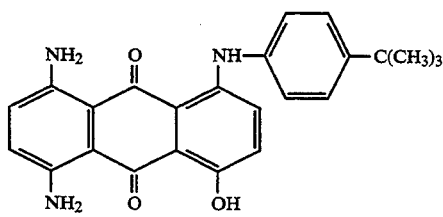

shall be excluded.

5. Dye mixtures as claimed in claim 4 comprising one or more pyridine dyes of the formula Ia or Ib where $R^3$ is cyano.

6. Dye mixtures as claimed in claim 4 comprising one or more pyridine dyes of the formula Ia or Ib where $R^2$ is derived from a component of the benzene, indole, quinoline, naphthalene, pyrrole, thiazole, benzimidazole, benzothiazole, thiophene or diaminopyridine series.

7. Dye mixtures as claimed in claim 4 comprising one or more blue disperse dyes of the class of the 1,8-dihydroxy-4,5-diaminoanthraquinones, 1,5-dihydroxy-4,8-diaminoanthraquinones, 1,4-diaminoanthraquinonedicarboximides, 1,4-diaminoanthraquinonedicarboximinoimides, thienylazo dyes, benzisothiazolazo dyes or cyanophenylazo dyes.

8. A method of dyeing or printing which comprises applying the dye mixtures of claim 4 to synthetic fibers, cellulose esters fibers or blends thereof from a dyeing liquor or paste.

9. Triazolopyridine dyes of the formula II

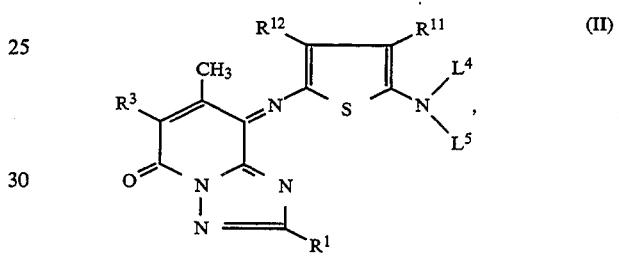

where
$R^1$ is $C_1$–$C_{20}$-alkyl, which may be substituted and may be interrupted by one or more oxygen atoms in ether function, substituted or unsubstituted phenyl, or hydroxyl, $R^3$ is cyano, carbamoyl, carboxyl or $C_1$–$C_4$-alkoxycarbonyl, $R^{11}$ is cyano, carbamoyl, mono- or di($C_1$–$C_8$-alkyl)carbamoyl or substituted or unsubstituted phenyl, $R^{12}$ is halogen, hydrogen, $C_1$–$C_4$-alkyl, $C_1$–$C_4$-alkoxy, $C_1$–$C_4$-alkylthio, unsubstituted or $C_1$–$C_4$-alkyl- or $C_1$–$C_4$-alkoxy-substituted phenyl or thienyl, and $L^4$ and $L^5$ are identical or different and each is independently of the other hydrogen or else, except or hydroxyl, the abovementioned radical $R^1$, provided that the dye of the formula

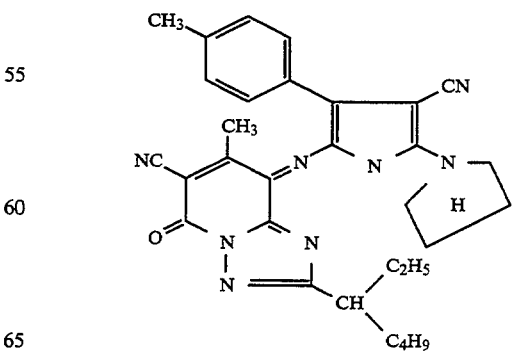

shall be excluded.

* * * * *